United States Patent
Dalgoutte

[11] 4,078,910
[45] Mar. 14, 1978

[54] GLASS SLEEVE FIBER JOINING

[75] Inventor: David George Dalgoutte, Harlow, England

[73] Assignee: International Standard Electric Corporation, New York, N.Y.

[21] Appl. No.: 676,731

[22] Filed: Apr. 14, 1976

[30] Foreign Application Priority Data

May 15, 1975 United Kingdom ............... 20587/75

[51] Int. Cl.² .................... C03C 25/02; C03C 23/20
[52] U.S. Cl. ......................................... 65/3 A; 65/3 C;
65/4 A; 65/4 B; 65/4 R; 65/36; 65/54;
350/96.23
[58] Field of Search ................ 65/DIG. 7, 4 B, 4 A,
65/4 R, 3 A, 3 C, 36, 54; 350/96 C

[56] References Cited

U.S. PATENT DOCUMENTS

| 3,455,625 | 7/1969 | Bromley et al. ................. 65/DIG. 7 |
| 3,579,316 | 5/1971 | Dyutt et al. ...................... 65/4 B X |
| 3,615,312 | 10/1971 | Landry ................................ 65/4 B |
| 3,810,802 | 5/1974 | Buhite et al. .................... 65/DIG. 7 |
| 3,819,249 | 6/1974 | Borner et al. ..................... 65/3 A X |
| 3,825,319 | 7/1974 | Cook et al. ...................... 65/DIG. 7 |
| 3,861,781 | 1/1975 | Hasegawa et al. ............... 65/4 B X |
| 3,928,102 | 12/1975 | Rowe et al. ..................... 65/DIG. 7 |
| 3,944,328 | 3/1976 | Kent et al. ....................... 65/DIG. 7 |
| 3,948,582 | 4/1976 | Martin ............................. 65/DIG. 7 |
| 3,960,531 | 6/1976 | Kohanzadeh et al. .......... 65/DIG. 7 |
| 3,989,567 | 11/1976 | Tardy .................................. 350/96 C |
| 4,008,061 | 2/1977 | Ramsay ............................. 65/4 B X |
| 4,028,162 | 6/1977 | Cherin et al. ..................... 65/4 B X |
| 4,033,668 | 7/1977 | Presby .............................. 350/96 C |

*Primary Examiner*—Richard V. Fisher
*Assistant Examiner*—Frank W. Miga
*Attorney, Agent, or Firm*—Thomas L. Peterson

[57] ABSTRACT

A permanent butt joint between optical fibers is made by inserting the bare fiber ends into the opposite ends of a slightly oversized bore in a sleeve of glass of lower melting point than the fibers. The central region of the sleeve is collapsed by softening. By this collapse, the butted fibers are brought into alignment. The joint may be protected with a length of heat shrink tubing fitted over the sleeve.

6 Claims, 3 Drawing Figures

GLASS SLEEVE FIBER JOINING

BACKGROUND OF THE INVENTION

The present invention relates to a method of joining glass optical fibers.

The need for forming butt joints or splices for optical fibers in the field of fiber optics communications is well known. Reference is made to U.S. Pat. Nos. 3,768,146 and 3,810,802 for examples of single fiber joints. The purpose of the present invention is to provide a simple and inexpensive method of making an optical fiber joint.

SUMMARY OF THE INVENTION

According to the principal aspect of the present invention, there is provided a method of joining glass optical fibers which method includes the step of introducing two bare sections of optical fibers, each havng a flat end substantially normal to the fiber axis, into opposite ends of a glass sleeve having a lower melting point than that of the fibers. The sleeve has a bore that provides a clearance fit over the bare fibers. The two ends of the fibers are butted together within the sleeve. The sleeve is heated in the vicinity of the fiber ends so as to cause the sleeve to collapse onto the fibers.

In the case of plastic coated fibers, the coatings are stripped to expose the bare fibers before the ends are inserted into the sleeve. A length of heat-shrinkable plastic tubing slightly longer than that of the sleeve may be slipped over one fiber prior to insertion into the sleeve. Then, after the glass sleeve has been collapsed onto the fiber ends, the heat-shrinkable plastic tubing is slid over the sleeve and shrunk over its end to give a measure of mechanical strengthening at the region when the fibers emerge from the glass sleeve.

DESCRIPTION OF THE PREFERRED EMBODIMENTS

A length of plastic coating is stripped from the ends of two plastic clad glass optical fibers 1 and 2, typically 1 mm in diameter, to expose regions 3 and 4 of bare fiber, typically 70–100 $\mu$m in diameter. The manner of stripping will depend upon the particular plastic material used for the coating. With a polypropylene coating the use of hot xylene as a solvent presents some difficulties, and so melting off the coating with a hot wire, a hot air gun, or soldering iron is preferred. If desired, the bared fiber can be immersed in cold xylene in case traces of the coating have been left, but these will dissolve only comparatively slowly in the cold solvent. One of the difficulties in using hot xylene is that the stripping is not confined to the immersed portion of the coating because the vapor is also reactive.

The two bared regions 3 and 4 of fibers are provided with flat end faces 5 and 6 by any suitable technique. A preferred technique is to score lightly the fiber surface and then subject the fiber to tensile stress until it breaks. Another technique involves placing the fiber on a sharp edge, such as that of a razor blade, applying the spark of a tesla coil to the fiber at the sharp edge, and then breaking the fiber at this point by bending it or applying tension.

Figure 1:
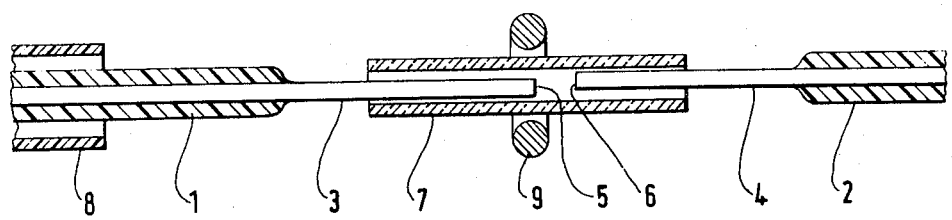
FIGS. 1, 2, and 3 are longitudinal sectional views illustrating successive stages in the manufacture of an optical fiber joint according to the invention.
Figure 2:
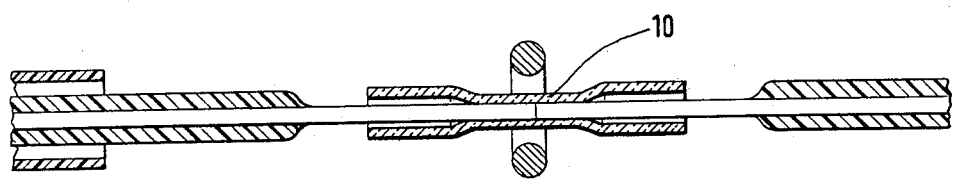

The two prepared ends of the fibers are next introduced into opposite ends of a glass sleeve 7, as seen in FIG. 1, and butted together somewhere near its midpoint, as seen in FIG. 2. Prior to this, a length of heat shrinkable plastic tubing 8 may be slipped over one fiber. This tubing is an optional item which may be used to given mechanical protection to the finished joint, particularly at the regions where the two fibers emerge from the glass sleeve. The sleeve is typically between ½ cm and 1 cm in length, and the heat shrinkable tubing 7 typically about 1 cm longer than the sleeve, so that after the joint has been made and the tubing slipped over the sleeve it will extend a short distance beyond each end of the sleeve.

The bore of the sleeve does not have to be a tight fit over the bare fibers, but is a clearance fit that is large enough for the fiber ends to be readily inserted by hand. To this end, it is convenient to employ sleeving that has a larger bore than is required, to soften a short length, and to draw it out or partially collapse it forming a necked portion of appropriate size, not shown. The central region of this necked portion is then parted from the remainder to provide a sleeve with slightly flared ends. If a sleeve is cut from parallel-walled sleeving having a bore of the appropriate size, the bore may be slightly flared at both ends by enlarging the ends with the tip of a heated needle. Such flaring is, however, not essential.

The central region of the glass sleeve is placed in a loop 9 of electrical resistance heating wire which is energized to raise the temperature and to soften the central region 10 of the sleeve which collapses around the fiber ends while the sleeve and fiber ends are unstressed and bringing them into alignment. It is believed that this collapse results primarily from the effects of surface tension. It is not desired that the fiber ends shall melt during this collapsing process, and, therefore, the material of the sleeve is chosen which has a lower melting point than that of the fibers. In the case of silica fibers, the sleeve may be made of a conventional borosilicate or soda-lime glass. The thermal expansion mismatch between silica and such glasses is liable to produce a certain amount of strain where the two glasses are sealed together. Where, for mechanical or optical reasons, this strain is too large to be acceptable for particular applications, a high silica (c. 96% $SiO_2$) glass may be used for the sleeve, such as that manufactured under the trademark VYCOR. Alternatively, the strain may be reduced by choosing a glass with a low melting point, such as one of the lead glasses.

Figure 3:
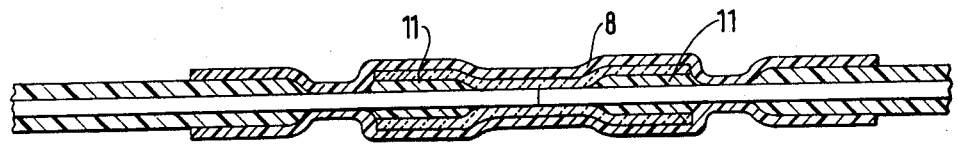

Optionally, each fiber may be further secured in the sleeve by the application of a fillet 11 of quick-setting cement, such as cycloacrylate adhesive, around the point of its emergence from the sleeve, as seen in FIG. 3. Finally, the length of heat-shrinkable tubing 7 is slipped over the sleeve 6 and is heated with a hot air gun to shrink it down onto the sleeve and the portions of the fiber adjacent the sleeve ends.

The dimensions of the sleeve 7 and optical fibers disclosed herein are given by way of example only, and not by limitation. Further, fibers other than plastic coated glass fibers could be used in the present invention.

What is claimed is:

1. A method of joining glass optical fibers comprising the steps of:
    introducing two bare sections of optical fibers, each having a flat end substantially normal to the fiber axis, into opposite ends of a glass sleeve having a lower melting point than that of the fibers, which sleeve has a bore providing a clearance fit over the bare fibers;

butting the two flat ends together within the sleeve; and heating the sleeve in the vicinity of the fiber ends while the sleeve and filter ends are unstressed to a temperature to cause the sleeve to collapse onto the fibers, the said heating step raising the temperature of the fibers to a point below the melting point thereof, whereby a joint is formed while the fiber ends are not distorted.

2. A method of joining glass fibers as set forth in claim 1 wherein:

a fillet of adhesive is applied to each end of the sleeve after the step of heating the sleeve in the vicinity of the fiber ends.

3. A method of joining glass fibers as set forth in claim 1 wherein:

after the joint is made a length of heat-shrinkable plastic tubing is positioned around the sleeve with its ends extending beyond both ends of the sleeve and the tubing is heated to cause it to shrink onto the sleeve and the adjoining emergent regions of fiber.

4. A method of joining optical fibers as set forth in claim 1 wherein:

the fibers are plastic coated whose ends are stripped of their sheathing prior to their insertion into the sleeve.

5. A method of joining optical fibers as set forth in claim 1 wherein:

the fibers are made of silica.

6. A method of joining optical fibers as set forth in claim 5 wherein:

the sleeve is made of boro-silicate or soda-lime glass.

* * * * *